United States Patent
Emminger

(10) Patent No.: US 10,488,110 B2
(45) Date of Patent: Nov. 26, 2019

(54) BELT DRYER AND METHOD FOR DEWATERING MICROALGAE

(71) Applicant: ECODUNA AG, Bruck an der Leitha (AT)

(72) Inventor: Franz Emminger, Hainburg a.d. Donau (AT)

(73) Assignee: ECODUNA AG, Bruck an der Leitha (AT)

( * ) Notice: Subject to any disclaimer, the term of this patent is extended or adjusted under 35 U.S.C. 154(b) by 16 days.

(21) Appl. No.: 15/759,675

(22) PCT Filed: Sep. 14, 2016

(86) PCT No.: PCT/AT2016/060057
§ 371 (c)(1),
(2) Date: Mar. 13, 2018

(87) PCT Pub. No.: WO2017/045003
PCT Pub. Date: Mar. 23, 2017

(65) Prior Publication Data
US 2019/0041133 A1    Feb. 7, 2019

(30) Foreign Application Priority Data
Sep. 14, 2015  (AT) .................................. A 594/2015

(51) Int. Cl.
*F26B 17/02*    (2006.01)
*F26B 3/28*    (2006.01)

(52) U.S. Cl.
CPC ............ *F26B 17/023* (2013.01); *F26B 3/286* (2013.01); *Y02B 40/74* (2013.01)

(58) Field of Classification Search
CPC ......... F26B 17/023; F26B 3/286; Y02B 40/74
(Continued)

(56) References Cited

U.S. PATENT DOCUMENTS 2,728,387 A    12/1955  Smith
3,266,559 A    8/1966  Osborne
(Continued)

FOREIGN PATENT DOCUMENTS

CA    2838953 C  *  1/2015  ............ A01G 33/00
DE    2 911 318    10/1980
(Continued)

OTHER PUBLICATIONS

PCT Search Report in PCT/AT2016/060057, dated Sep. 2015.
Austrian Search Report in A 594/2015, dated Apr. 2017.

*Primary Examiner* — Stephen M Gravini
(74) *Attorney, Agent, or Firm* — Greenblum & Bernstein, P.L.C.

(57) ABSTRACT

The invention relates to a method and a device for obtaining dewatered biomass from algae and/or microorganisms. The concentrated biomass available as a result of the harvesting process is spread over an endless conveyor belt (1) and exposed to heated air on the conveyor belt (1). The air is heated by the sun and/or an air heater (5) in a closed system, the conveyor belt (1) being enclosed by a light-permeable casing (2). The drying process is carried out until a residual moisture is achieved, the dewatered biomass adhering to the conveyor belt (1) at the end of the drying process. Said biomass is separated from the conveyor belt (1) by means of a doctor- or scraper edge (9) and is gathered in a collection container (8).

20 Claims, 4 Drawing Sheets

Figure 1:
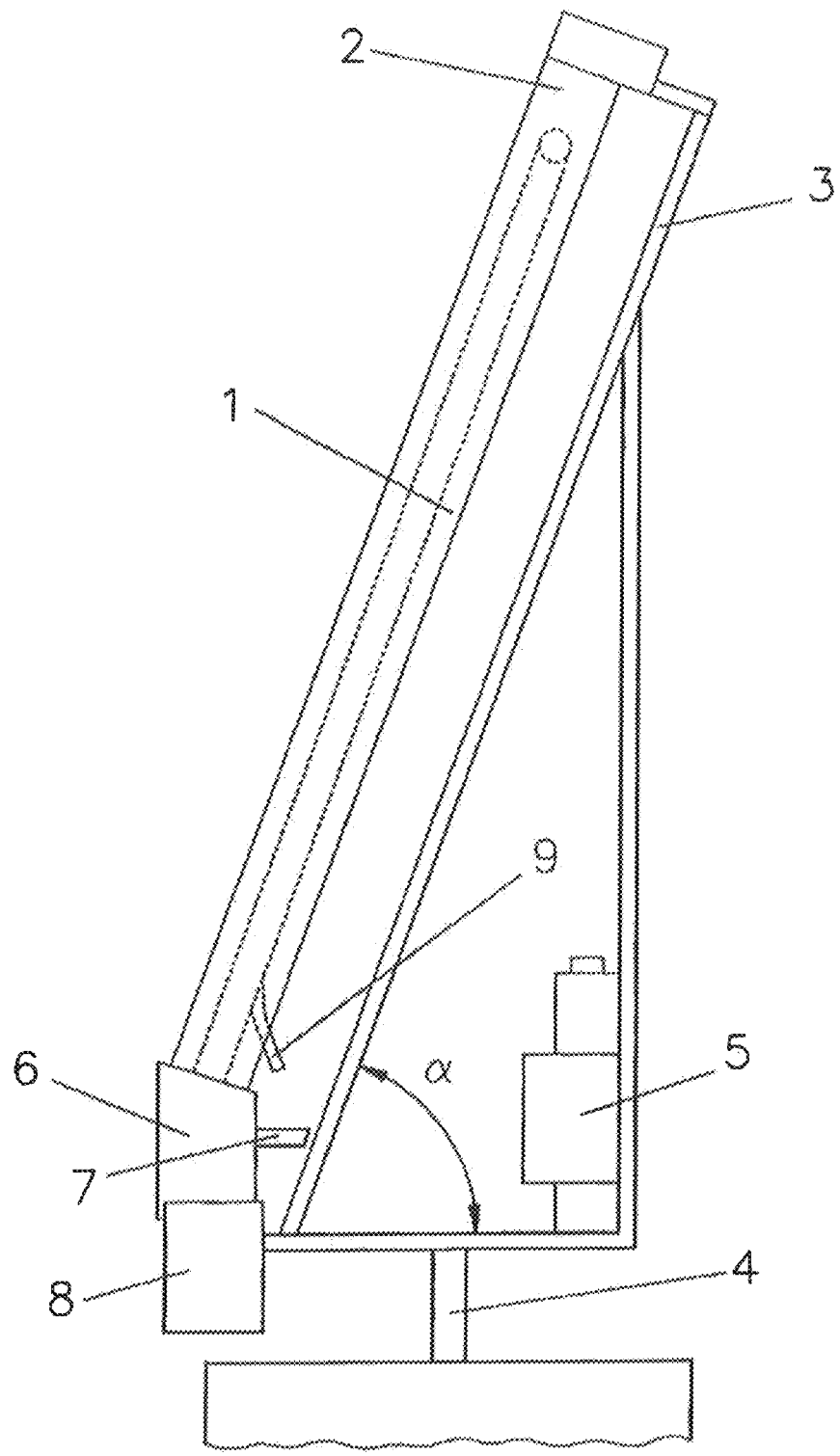

(58) Field of Classification Search
USPC .......................................................... 34/93
See application file for complete search history.

(56) References Cited

U.S. PATENT DOCUMENTS

| | | | | |
|---|---|---|---|---|
| 4,226,210 A * | 10/1980 | Lockwood | ............ | A01K 61/54 |
| | | | | 119/236 |
| 5,202,034 A | 4/1993 | Martel | | |
| 5,981,271 A * | 11/1999 | Doucha | .................. | A01G 33/00 |
| | | | | 435/292.1 |
| 7,905,049 B2 * | 3/2011 | Erd | ........................ | A01G 33/00 |
| | | | | 47/1.4 |
| 8,826,657 B2 * | 9/2014 | McAlister | ................. | F03G 7/05 |
| | | | | 60/495 |
| 8,895,289 B2 * | 11/2014 | Mohr | ..................... | C12M 21/02 |
| | | | | 435/257.1 |
| 9,005,918 B2 * | 4/2015 | Dvorak | ................. | C12M 21/02 |
| | | | | 435/257.1 |
| 9,101,942 B2 * | 8/2015 | Rice | ..................... | B03D 1/1431 |
| 9,260,689 B2 * | 2/2016 | Mohr | ..................... | C12M 21/02 |
| 2008/0178739 A1 * | 7/2008 | Lewnard | ................ | B01D 53/84 |
| | | | | 95/186 |
| 2012/0130099 A1 | 5/2012 | Wittenberg | | |
| 2014/0127776 A1 * | 5/2014 | Picard | .................... | A01G 33/00 |
| | | | | 435/178 |
| 2014/0182158 A1 | 7/2014 | Ghosh | | |
| 2019/0041133 A1 * | 2/2019 | Emminger | .............. | F26B 3/286 |

FOREIGN PATENT DOCUMENTS

| | | | | |
|---|---|---|---|---|
| DE | 94 04 451 | 5/1994 | | |
| DE | 43 01 993 | 7/1994 | | |
| DE | 10 2010 017 097 | 5/2010 | | |
| DE | 10 2009 001 024 | 8/2010 | | |
| EP | 2 848 883 | 9/2013 | | |
| GB | 1 055 284 | 1/1967 | | |
| JP | 3868476 | 1/2007 | | |
| JP | 2013-117333 | 6/2013 | | |
| KR | 20140040212 A * | 4/2014 | ............ | A01G 33/00 |
| RU | 2022219 | 10/1994 | | |
| WO | WO-2010045631 A3 * | 8/2010 | ............ | C12M 21/02 |
| WO | 2010/140037 | 12/2010 | | |
| WO | WO-2012087741 A2 * | 6/2012 | ............ | C12M 21/02 |
| WO | WO-2012171123 A1 * | 12/2012 | ............ | A01G 33/00 |

* cited by examiner

BELT DRYER AND METHOD FOR DEWATERING MICROALGAE

The invention relates to a method for obtaining dewatered biomass from algae and/or microorganisms, for example after a process of harvesting the algae and/or microorganisms from a suspension consisting of a nutrient solution, in particular in cultivation and production or hydro-cultivation. Furthermore, the invention also relates to a device for carrying out the method and a container with dewatered biomass obtainable by the method.

Algae (in particular microalgae belonging to phototrophic microorganisms) are cultivated mainly because of their valuable ingredients required, for example, in the manufacture of medical preparations, food and feeds, dietary supplements, and cosmetics. These ingredients include, among other things, unsaturated fatty acids (e.g. Omega-3 and Omega-6 fatty acids), antioxidants, such as astaxanthin and lutein, and chlorophyll. The composition of the ingredients depends on the cultivated type of phototrophic, mixotrophic or heterotrophic microorganisms. Primarily, a pure culture of phototrophic, mixotrophic or heterotrophic microorganisms is grown to be able to ensure a certain quality or minimum concentration of the desired ingredients. Usually, the microorganisms undergoing photosynthesis are cultivated under the influence of light (e.g. sunlight and/or artificial light) in a culture medium rich in nutrients in a photobioreactor, and are subsequently concentrated ("harvested") and dewatered or dried, respectively. From the biomass obtained in this manner, the ingredients may be obtained for further processing, or the biomass itself may be used as food, feeds or fertilizer.

Methods and plants for drying crops are known in many variations and preferably adapted to the crop.

For example, a conveyor dryer with a traveling screen disposed in a closed drying space on which the goods to be dried are transported is known from DE 94 04 451 U1. Here, supplied dry air is applied to the traveling screen from above, and the outgoing air accruing during the drying process is sucked off by an extract fan underneath the traveling screen. Dust filters and filter elements are provided underneath the traveling screen for cleaning the outgoing air.

Furthermore, from DE 43 01 993 A1, a plant for drying crops, in particular grass, stalk, and leaf goods, is known.

From DE 10 2010 017 097 A1, a drying plant and a method for biomass and/or sludge are known. In this plant, the waste heat from a biogas plant is used for the drying process. This waste heat is supported by solar heat recovery. The dried biomass is available as a fuel.

Furthermore, from EP 2 848 883 A1, a conveyor drying plant with a conveyor belt for drying dry products, such as sawdust, is known.

Furthermore, DE 2911318 A1 discloses a method or a device for drying agricultural and horticultural goods. JP 3868476 B1 describes a plant and a method for the continuous drying of sawdust and other raw materials.

DE 102009001024 A1 relates to a method for drying moist goods and a pertaining drying space. US 2014/182158 A1 describes a drying chamber and a joined absorber for utilizing solar energy. RU 2022219 C1 describes a drying apparatus comprising a drying chamber that can be tilted with respect to the horizontal line and caused to vibrate, and which has a transparent roof. JP 2013-117333 A (D6) describes a multi-stage conveyor dryer for pasty materials (e.g. food).

None of the above mentioned documents deals with drying processes for algae. Only from WO 2010/140037 A1, a method for drying algae biomass with a conveyor dryer is already known, here, however, a relatively inefficient drying process is performed.

It is the object of the invention to provide a method of the type mentioned in the beginning which on the one hand avoids disadvantages of the known methods and devices and is preferably suited for drying biomass from algae and/or microorganisms in a continuous, rational and economic harvesting process.

It is in particular part of this object to improve the quality or further processability of the obtained biomass by a drying process as gentle as possible. For example, an oxidation or decomposition of the valuable ingredients during drying should be avoided if possible, which should be done, of course, while considering the profitability of the drying process.

The method according to the invention is characterized in that the concentrated biomass, preferably available as a result of the harvesting process, which is a concentrated algae or microorganism suspension, is spread over a, preferably endless conveyor belt, that the biomass spread at the conveyor belt is exposed to heated air, wherein the air is heated by the sun and/or an air heater in a closed system, that the drying process is carried out until a residual moisture is achieved, wherein the dewatered biomass adhering (optionally in the form of powder and/or flakes) to the conveyor belt at the end of the drying process, and that this biomass (optionally in the form of powder and/or flakes) is separated from the conveyor belt by means of a doctor- or scraper edge and is, preferably after further drying (in other words: final drying), gathered in a collection container. This biomass is preferably present in the form of powder and/or flakes, in particular already before further drying (if carried out), or in the collection container.

By the biomass adhering, at the end of the drying process and appropriately already before, to the conveyor belt (in contrast to the disclosure, for example, of WO 2010/140037 A1), the drying process is facilitated, among other things because the risk of material loss is reduced (in particular in case of greater angles, $\alpha$, cf. FIG. 1, or with a higher speed of the heated air due to the use of a more powerful fan). In contrast to well-known conveyor dryers for microalgae (as disclosed, for example, in WO 2010/140037 A1), in the present invention, the use of a doctor- or scraper edge is therefore inevitable.

Furthermore, the finding in the course of the present invention permits that biomass from algae and/or microorganisms may be (finally) dried in particular into a flake-like form (though the biomass adheres to the conveyor belt in the dewatered state), that, if the conveyor belt is circulated endlessly, the conveyor belt may be used nearly over the complete length for the drying process (that means even when the surface supporting the biomass faces downwards and non-adhering biomass would fall off the conveyor belt). This leads, among other things, to the saving of space and also of energy since after all, a lower volume of air has to be heated. In a preferred embodiment, the biomass-transporting surface of the conveyor belt (or the surface of the conveyor belt the biomass adheres to) therefore faces downwards in at least a part of the transport section, wherein the surface may be optionally inclined with respect to the horizontal line along the direction of transport (that means, it does not have to be parallel to the horizontal line), preferably over a transport length of at least 0.5 meters, preferably at least 1 meter, more preferred at least 2 meters, in particular at least 2.5 meters.

It turned out in connection with the present invention that an inclination of the conveyor belt is advantageous among other things for improving the uniformity of the application of the biomass onto the conveyor belt and achieve smaller layer thicknesses of the applied biomass to be dried than is the case, for example, according to the teaching of WO 2010/140037 A1. Thereby, lower temperatures for gentler drying may be employed which increases the quality of the dewatered biomass. Therefore, in a particularly preferred embodiment of the present invention, the conveyor belt (in particular in or with a transparent enclosure) or its longitudinal axis is arranged at a freely selectable angle with respect to the horizontal line. The angle is appropriately more than 5°, preferably more than 10°, more preferred more than 20°, still more preferred more than 30° or even more than 400, in particular more than 50° or even more than 60°. Moreover, the conveyor belt may thus be adapted to the solar altitude if drying takes place with the aid of sunlight. It is of course evident for the person skilled in the art that a "freely selectable angle with respect to the horizontal line" does not mean a supposed "angle" of 0° with respect to the horizontal line. Appropriately, the transport section over which the conveyor belt is directed at this angle with respect to the horizontal line is at least 0.5 meters, preferably at least 1 meter, more preferred at least 2 meters, in particular at least 2.5 meters. By the biomass adhering to the conveyor belt, steep angles or long transport sections can be permitted at this angle.

It is particularly advantageous for gentle drying if the layer thickness of the concentrated algae or microorganism suspension spread over the conveyor belt (i.e. at the beginning of the drying process) is on average between 0.2 mm and 2 mm, preferably between 0.3 mm and 1.9 mm, or even between 0.4 mm and 1.8 mm, more preferred between 0.5 mm and 1.7 mm, or even between 0.6 mm and 1.5 mm, in particular between 0.75 mm and 1.25 mm, or even substantially 1 mm.

To improve the uniformity or thickness of the application, it is appropriate to dip the conveyor belt or a mating roller operationally connected with the conveyor belt at least partially into the concentrated biomass which is present as a concentrated algae or microorganism suspension, to spread the biomass on the conveyor belt. In the first case (i.e. without the use of a mating roller), e.g. pumps in combination with sealing lips forming a front side superficial reservoir may be employed to prevent the back side of the conveyor belt from also being wetted (which might lead to impurities which are difficult to remove).

It turned out in connection with the invention that it is advantageous for the application or adhesion of the biomass if the conveyor belt comprises a surface (for the application of the biomass) which is rough and/or textured and/or hydrophilic (preferably at least two of them, in particular rough, textured and hydrophilic). Appropriately, the surface has an arithmetical average Ra of more than 0.1 µm, preferably more than 0.5 µm or even more than 1 µm, preferably more than 2 µm, or even more than 3 µm, still more preferred more than 5 µm, or even more than 10 µm, in particular more than 15 µm or even more than 20 µm. Preferably, Ra is determined according to the DIN EN ISO 4287:2010-07 standard. As an alternative or in addition, the surface appropriately has a contact angle to water of at most 90°, preferably at most 87.5°, more preferred at most 85°, still more preferred at most 82.5°, in particular at most 80° or even at most 75°. The determination of the contact angle of the surface to water can be effected by methods known to the person skilled in the art, for example according to the DIN 55660-2:2011-12 standard, using commercially available measuring devices for the determination of the contact angle, for example the contact angle measurement systems available from Krüss (Hamburg, DE).

As materials particularly suited for the application or adhesion, elastomers, in particular natural rubber, such as nitrile rubber, have been found. Therefore, the mentioned surface of the conveyor belt preferably consists, in a preferred embodiment, of an elastomer, preferably of natural rubber, in particular of nitrile rubber.

In a preferred embodiment, the concentration of algae or microorganisms (before they are applied onto the conveyor belt) in the concentrated biomass is between 10 g/L and 1000 g/L, preferably between 50 g/L and 750 g/L, still more preferred between 75 g/L and 400 g/L, in particular between 100 g/L and 200 g/L.

For an appropriate process flow, the residual moisture of the biomass is less than 50%, preferably less than 40%, more preferred less than 30%, still more preferred less than 27.5%, in particular less than 25%, in particular directly before it meets the doctor- or scraper edge. It turned out in practice that it is advantageous not to excessively dry the biomass so that the adhesion to the conveyor belt will not become too strong. Therefore, the residual moisture of the biomass is preferably more than 5%, preferably more than 10%, more preferred more than 15%, still more preferred more than 17.5%, in particular more than 20%, where this is in particular advantageous for the production of the dewatered biomass in flakes (flake form).

The further drying (to improve preservability) may be performed by any further drying operation, preferably a convection drying operation, in particular a belt drying operation. In this operation, a residual moisture of the biomass of less than 10%, preferably less than 5%, is achieved. It is (in particular in view of the quality of the end product) particularly appropriate to carry out the drying of the biomass in this drying operation at 20° C. to 70° C., preferably 30° C. to 60° C., in particular 40° C. to 50° C. Appropriately, the duration of the drying operation in this drying operation is between 0.5 minutes and 20 minutes, preferably between 1 and 10 minutes, in particular between 2 and 8 minutes. This further drying step (final drying step) may be performed on a collection belt (in particular as a convection drying step) which directs the dewatered biomass to the collection container.

The method according to the invention turned out to be particularly suited for algae that are microorganisms (also referred to as "microalgae").

It showed that the larger the individual cells are or the more the cell shape equals a spherical shape, the better the results of the method according to the invention are with microalgae. Therefore, the algae to be dried are, in a preferred embodiment, selected from microalgae with a coccal or spherical cell shape. During the numerous experiments in the course of the present invention it showed that the method according to the invention is suited for algae having quite small cell diameters, such as e.g. *Nannochloropsis*, but, among other things, the application and removal with the doctor- or scraper edge works better when the cell diameter is larger. Therefore, the use of (in particular spherical or coccal) microalgae with an average cell diameter of more than 3 µm, preferably more than 4 µm, or even more than 5 µm, still more preferred more than 6 µm or even more than 7 µm, still more preferred more than 8 µm or even more than 9 µm, in particular more than 10 µm is to be preferred.

It showed in experiments that the method of the present invention works particularly well with the following algae which are therefore preferred: algae, selected from the order of Chlorellales, preferably the family of Chlorellaceae, more preferred the genus *Auxenochlorella* or *Chlorella*, in particular *Chlorella vulgaris*, and the order of Volvocales, preferably the family of Haematococcaceae, more preferred the genus *Haematococcus*, in particular *Haematococcus pluvialis*, and the order of Eustigmatales (however preferably without *Nannochloropsis* for the reasons mentioned above), preferably of the families of Loboceae, Chlorobothryaceae, Pseudocharaciopsidaceae, and Eustigmataceae.

With the invention, it is moreover possible to dry the freshly harvested concentrated biomass, in particular the concentrated algae or microorganism suspension, ideally directly after the harvest, where a very high quality is maintained and a degradation of the biomass and its ingredients is prevented which is of great importance. In particular algae are produced in sunlit locations, so it is in accordance with the sustainability and environmental consciousness to also employ the available solar energy as a primary source of energy for the drying of the biomass and the microorganisms. It is just the production of preferably microalgae which is, as green biotechnology, a pioneer in terms of ecological industrial applications, and the utilization of sustainable resources is aimed for at all times.

According to a particular feature of the invention, the spreading of the concentrated biomass, in particular the concentrated algae or microorganism suspension, over the conveyor belt and/or the heating of the biomass at the conveyor belt and/or the separation of the biomass from the conveyor belt are accomplished continuously. The prior production process and the harvesting operation and the concentration of the biomass are mainly effected continuously. Thus, by continuous drying, a storage of large amounts of moist biomass is avoided, and an undesired oxidation process and a deterioration of the biomass are largely avoided.

According to a particular development of the invention, for heating the air for drying the biomass, the conveyor belt with the biomass adhering to the conveyor belt is directed corresponding to the solar altitude, in particular by rotating the star handle and/or changing the angle with respect to the horizontal line. To follow the solar altitude increases efficiency and permits a largely complete use of the available energy without having to resort to large collectors, for example.

According to another particular development of the invention, the drying of the biomass (on the conveyor belt) is carried out at 20° C. to 70° C., preferably at 30° C. to 60° C., in particular at 40 to 50° C. The desired temperature range is, for maximum efficiency, restricted to a desired maximum temperature to exclude thermal degeneration of the biomass. Appropriately, the duration of the drying operation here is between 0.5 minutes and 20 minutes, preferably between 1 and 10 minutes, in particular between 2 and 8 minutes.

Preferably, the air coming into contact with the biomass on the conveyor belt (which may be directed in co-current flow or counter flow with respect to the conveyor belt) is circulated and/or dewatered in a closed manner.

According to a further particular feature of the invention, the air surrounding the conveyor belt for drying the biomass is heated directly via insolation and optionally indirectly via reflection surfaces provided in the closed system. Apart from the direct solar radiation on the side facing the sun, the efficiency of the plant is increased by an energy input into the biomass or onto the collector tubes being achieved on the side facing away from the sun by reflectors.

According to a particular embodiment of the invention, the biomass to be dried at the conveyor belt, which is in particular arranged at an angle, is initially transported from the bottom to the top and preferably exposed to direct insolation, and after the deflection of the conveying belt, the biomass at the conveyor belt to be dried is transported from the top to the bottom and preferably exposed to indirect insolation. The angle of direct and indirect insolation is adjusted to the solar altitude to optimize the energy input.

According to a particular development of the invention, the moisture and/or the temperature of the air and/or the biomass is measured in the spreading of the biomass at the conveyor belt and/or in the drying section and/or in the region of the collection container. Measuring the moisture and temperature of the biomass and the (incoming and outgoing) air is employed for monitoring the process and supplying data for process control and optimization.

Furthermore the present invention relates to a container with dewatered biomass from algae and/or microorganisms, wherein the biomass is obtainable by the method according to the invention. The container is, for example, a ton or a box, the container may be labeled or marked e.g. with a date of filling or a date of expiry (depending on the residual moisture). Preferably, this container is a closed container.

It is advantageous to have more than 50 percent by weight, preferably more than 60 percent by weight, more preferred more than 70 percent by weight, or even more than 80 percent by weight, still more preferred more than 90 percent by weight, or even more than 95 percent by weight, in particular more than 99 percent by weight or even 100 percent by weight of the mentioned biomass present in the form of flakes. As has turned out in the course of the present invention, these flakes are particularly suited for supercritical fluid extraction e.g. with carbon dioxide because the efficiency of extraction of ingredients of biomass is increased as compared to the forms of algae/microorganism biomass known from prior art, such as e.g. spray-dried powder.

It is highly preferred that the dewatered biomass (in particular when present in the form of flakes) has not been subjected to any drum drying or tumbler drying step and has not been finally dried in a drum or tumbler dryer. These two methods are normally detrimental to the quality of the ingredients (e.g. due to the high temperatures employed).

In particular for the above-described supercritical fluid extraction, it is particularly suitable for said flakes to have, on average, a thickness of 0.1 to 2 mm, preferably 0.2 mm to 1.5 mm, more preferred 0.3 mm to 1.0 mm, still more preferred 0.4 mm to 0.9 mm, in particular 0.5 mm to 0.8 mm, and/or for said flakes to have, on average, along their longest dimension an extension which is more than 1 cm, preferably more than 2 cm, more preferred more than 3 cm, still more preferred more than 4 cm, in particular more than 5 cm and/or less than 100 cm, preferably less than 75 cm, more preferred less than 50 cm, still more preferred less than 40 cm, in particular less than 30 cm or even less than 20 cm.

In a further preferred embodiment, said flakes have (in particular after the final drying) a residual moisture of less than 10%, preferably less than 5%.

In a further preferred embodiment of the container, said biomass is a biomass from algae which are microorganisms. As was already discussed, with microalgae, the method according to the invention gives better results the larger the individual cells are or the more the cell shape equals a spherical shape. Therefore, the algae are, in a preferred embodiment of the container, selected from microalgae having a coccal or spherical cell shape. During the numerous experiments in the course of the present invention it showed that the method according to the invention is suited for algae having smaller cell diameters, such as e.g. *Nannochloropsis*, but that among other things, the application or removal by the doctor- or scraper blade works better with a larger cell diameter. Thus, the use of (in particular spherical or coccal) microalgae with an average cell diameter of more than 3 µm, preferably more than 4 µm or even more than 5 µm, even more preferred more than 6 µm or even more than 7 µm, still more preferred more than 8 µm or even more than 9 µm, in particular more than 10 µm, is also to be preferred in the container according to the invention. Particularly preferred are algae selected from the order of Chlorellales, preferably the family of Chlorellaceae, more preferred the genus *Auxenochlorella* or *Chlorella*, in particular *Chlorella vulgaris*, and the order of Volvocales, preferably the family of Haematococcaceae, more preferred the genus *Haematococcus*, in particular *Haematococcus pluvialis*, and the order of Eustigmatales (however preferably without *Nannochloropsis* for the reasons mentioned above), preferably of the families of Loboceae, Chlorobothryaceae, Pseudocharaciopsidaceae, and Eustigmataceae.

A further object of the invention is to provide a device by which the economic performance of the above method is ensured.

This object of the invention is achieved by a device for carrying out the method for obtaining dewatered biomass.

The device according to the invention is characterized in that a conveyor belt, in particular an endless conveyor belt, is provided for receiving the biomass, that this conveyor belt is surrounded by a transparent enclosure, for example a tube or a channel-like hull structure, to form a closed system, that the conveyor belt with the enclosure (or its longitudinal axis) is arranged at a freely selectable angle with respect to the horizontal line, and that this conveyor belt with the enclosure is arranged to rotate, preferably on a star handle. Preferably, there is a further enclosure between the conveyor belt and the above mentioned enclosure, i.e. a non-transparent (preferably dark or black) enclosure which also encloses the conveyor belt and a gas space which is in direct contact with the conveyor belt. In a particularly preferred embodiment, the two enclosures are embodied as concentric tubes, in particular wherein the air between the transparent and the non-transparent enclosures is used for thermal insulation of the air within the non-transparent enclosure (which air is in direct contact with the conveyor belt).

The angle is appropriately more than 5°, preferably more than 10° more preferred more than 20°, still more preferred more than 30° or even more than 40°, in particular more than 50° or even more than 60°. Appropriately, the transport section over which the conveyor belt is directed at this angle with respect to the horizontal line is at least 0.5 meters, preferably at least 1 meter, more preferred at least 2 meters, in particular at least 2.5 meters.

In a preferred embodiment, the conveyor belt or a mating roller operationally connected with the conveyor belt may be at least partially dipped into a supply, the supply being preferably provided as an open reservoir for the concentrated biomass which is present as concentrated algae or microorganism suspension.

According to a particular feature of the invention, a reflection surface, preferably a mirror, in particular a flat or paraboloidal-type reflector, is placed under the conveyor belt with the enclosure. A reflection surface, located behind the transparent hull structure, as viewed from the direction of irradiation of the sun, permits a more efficient utilization of the irradiated energy.

According to a particular embodiment of the invention, the transparent enclosure consists of plastics or glass. Both materials have their special advantages and may be employed in an application-specific manner.

According to a further particular feature of the invention, the conveyor belt is an adhesion belt. The adhesion or adhering force causes a boundary layer to form between the belt and the concentrated suspension with biomass. The main property of adhesion is a mechanical cohesion of phases involved. Such a belt showed to be very suited for the purpose of transporting the biomass in the experiments.

The conveyor belt (or a surface thereof) preferably includes an elastomer, preferably a natural rubber, in particular a nitrile rubber, and/or it is rough or textured and/or hydrophilic (preferably at least two of them, in particular rough, textured and hydrophilic), wherein the surface has an arithmetical average Ra of more than 0.1 µm, preferably more than 0.5 µm or even more than 1 µm, more preferred more than 2 µm or even more than 3 µm, still more preferred more than 5 µm or even more than 10 µm, in particular more than 15 µm or even more than 20 µm. As an alternative or in addition, the surface appropriately has a contact angle to water of at most 90°, preferably at most 87.5°, more preferred at most 85°, still more preferred at most 82.5°, in particular at most 80° or even at most 75°.

The conveyor belt appropriately has at least one deflection of more than 45°, preferably more than 90°, still more preferred more than 135°, in particular essentially 180° (cf. FIG. 1) in the region loaded with biomass in operation. In a preferred embodiment, the speed of the conveyor belt is controllable to better control the drying process.

In a preferred embodiment, the surface of the conveyor belt provided for the transport of the biomass faces downwards in at least a part of the transport section, wherein the surface may optionally be inclined with respect to the horizontal line along the direction of transport (that means, it does not have to be parallel to the horizontal line), preferably over a transport length of at least 0.5 meters, preferably at least 1 meter, more preferred at least 2 meters, in particular at least 2.5 meters.

According to a preferred embodiment, the conveyor belt is operationally connected with a doctor- or scraper edge. Appropriately, the distance of this edge to the conveyor belt is adjustable.

According to a further embodiment of the invention, an air heater is provided for heating the air for drying the biomass in case of insufficient sunlight.

According to a further development of the invention, at the beginning and/or in the region and/or at the end of the drying section, at least one moisture and/or one temperature measuring device is provided, preferably via sensors. The devices for measuring the moisture and temperature both of the biomass and the air are used for process monitoring and quality assurance and to supply data for the process control and optimization.

According to a particular development of the invention, a plurality of devices consisting of a conveyor belt with enclosure are arranged on the star handle. Thereby, a scaling or an arrangement of parallel processes is possible, of course.

In the context of the present invention, the terms "average", "mean", and "mean value" are to be understood both as the arithmetic average and the median, the latter being preferred. Herein, the term "cell diameter" of a microalga is to be understood as the diameter of the microalga in its hydrated, living condition, e.g. during cultivation. The person skilled in the art knows that the diameter of a cell will be reduced during the drying process.

The invention will be illustrated more in detail with reference to exemplified embodiments represented in the drawings or pictures.

Figure 2:
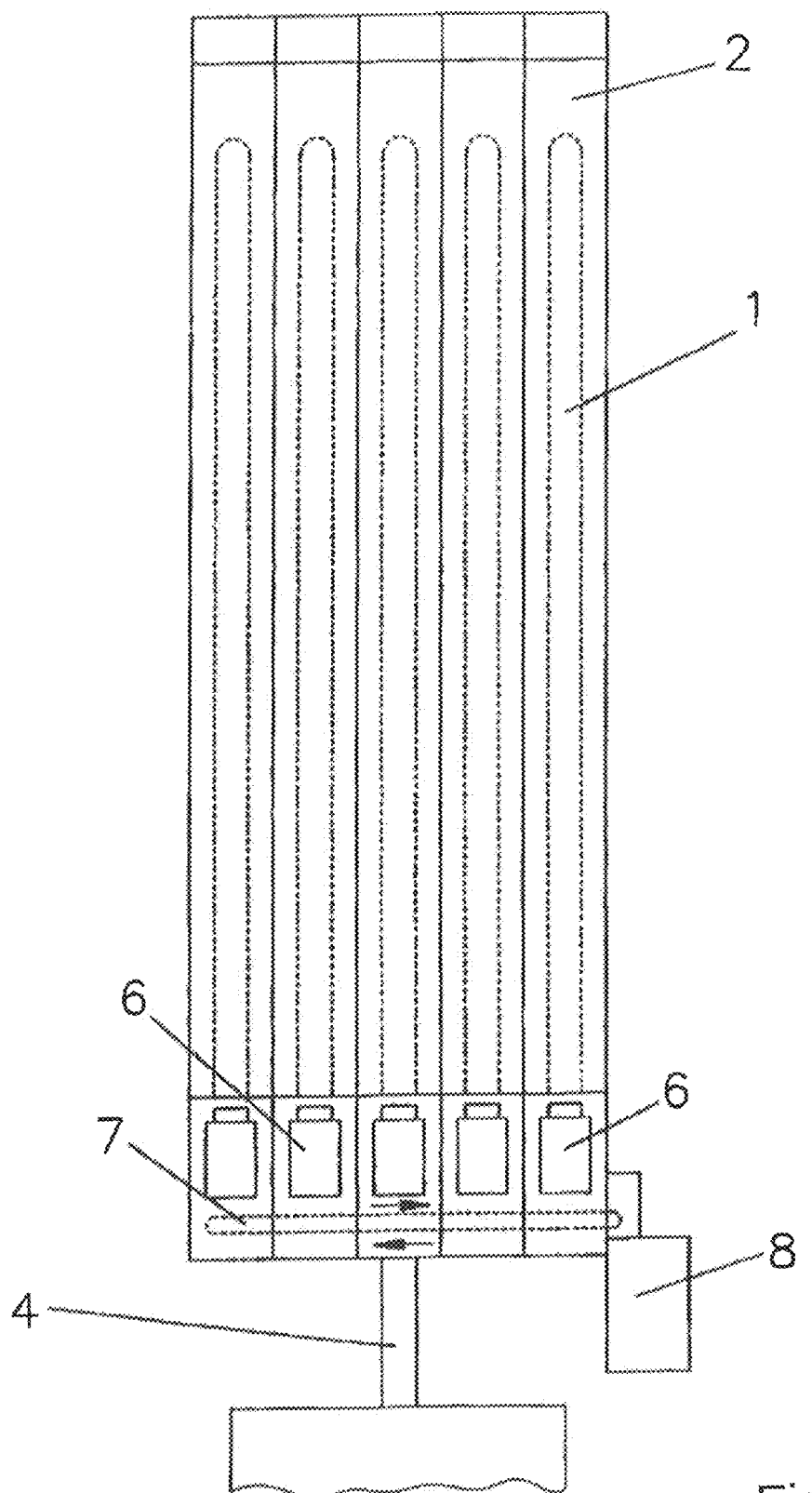
Figure 3:
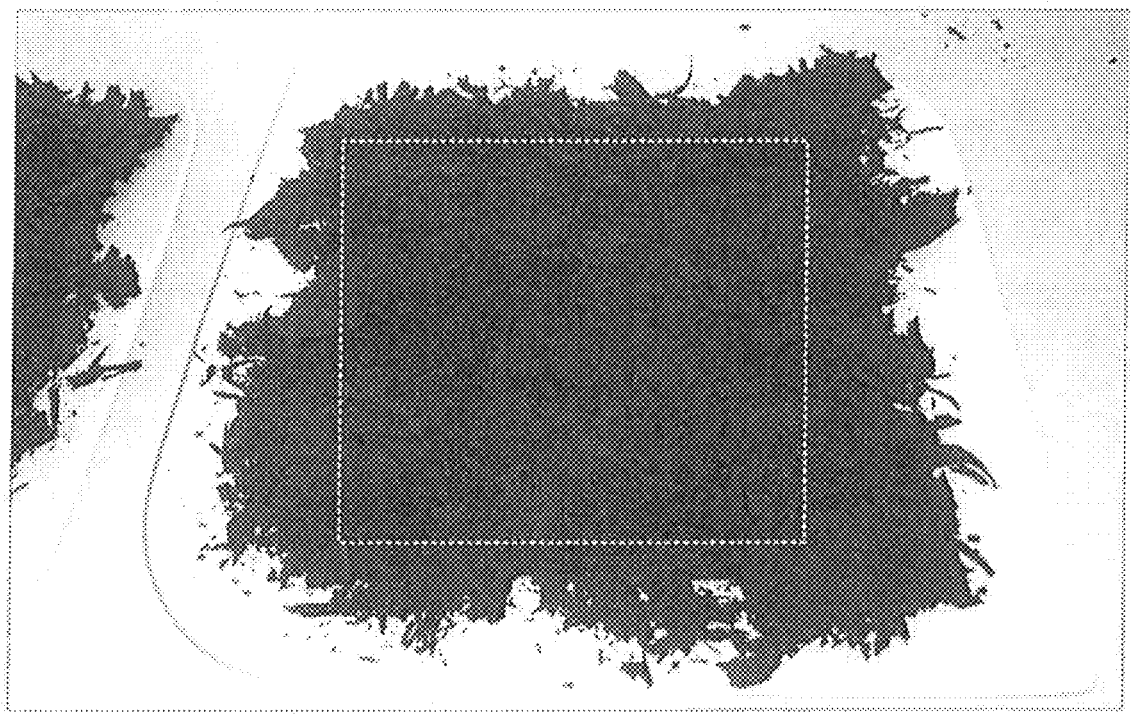
Figure 3:
Figure 4:
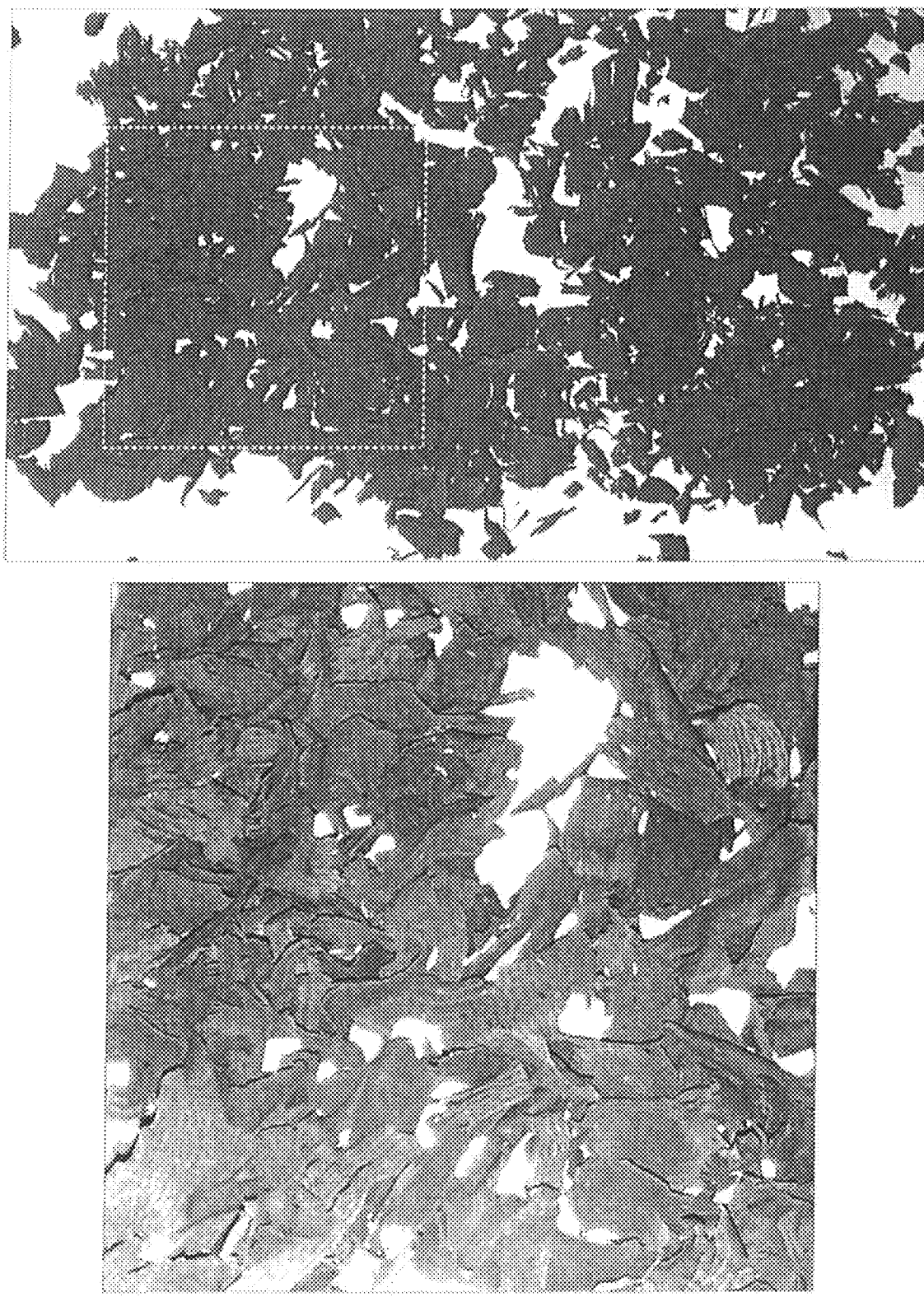

In the drawings:

FIG. 1 shows a schematic representation of a side view of a device for obtaining dewatered biomass, FIG. 2 shows a schematic representation of a plurality of conveyor belts arranged one next to the other, FIG. 3 shows illustrations of the dewatered biomass according to the invention in the form of flakes of *Chlorella vulgaris* with a residual moisture of about 22.5%, and FIG. 4 shows illustrations of the dewatered biomass according to the invention in the form of flakes of *Chlorella vulgaris* with a residual moisture of less than 5% after the final convection drying step on a conveying belt.

According to FIG. 1, the device for obtaining dewatered biomass, i.e. for drying it, comprises a conveyor belt 1, in particular an endless conveyor belt, for receiving the biomass. The conveyor belt 1 is a rough textured belt which is coated with nitrile rubber. Furthermore, this conveyor belt 1 is surrounded by a transparent enclosure 2, for example a tube or a channel-like hull structure, to form a closed system. A reflection surface 3, preferably a mirror, in particular a flat or paraboloidal-type reflector, is placed under the enclosure 2 with the conveyor belt 1 inside. The transparent enclosure 2 preferably consists of plastics or glass.

The conveyor belt 1 with the enclosure 2 is arranged at a freely selectable angle α with respect to the horizontal line. The dimension of the angle α is selected corresponding to the altitude of the sun and the insolation, but is in this embodiment in any case more than 40°. The conveyor belt 1 with the enclosure 2 is arranged to be rotatable, preferably on a star handle 4.

To heat the air for drying the biomass, an air heater 5 is provided if there is not sufficient sunlight.

At the lower end of the conveyor belt 1, i.e. at the rising part of the conveyor belt 1, a supply 6 for the moist biomass is provided. At the back of the conveyor belt 1, i.e. in the region of the star handle 4, at the end of the endless conveyor belt 1, a collection belt 7 for final drying and the transport of the dewatered biomass into a collection container 8 is provided. To scrape off the dewatered biomass, a doctor- or scraper edge 9 is arranged at the back of the conveyor belt 1, that means at the end of the endless conveyor belt 1.

At the beginning and/or in the region and/or at the end of the drying section, moisture and/or temperature measuring devices are provided. These measuring device are preferably sensors.

According to FIG. 2, a plurality of devices consisting of the conveyor belt 1 with the enclosure 2 are arranged on the star handle 4. For each conveyor belt 1, one supply 6 for the moist biomass is provided. Equally, the collection belt 7 transports the dewatered biomass into the collection container 8.

Below, with reference to FIG. 1 and FIG. 2, the method for obtaining dewatered biomass from algae and/or microorganisms, for example after the process of harvesting the algae and/or microorganisms from a suspension consisting of a nutrient solution, in particular in cultivation and production or hydro-cultivation, is shown in detail.

The present concentrated biomass of *Chlorella vulgaris* (concentration: 150 g/L) is spread over a preferably endless conveyor belt 1 via the supply 6. The biomass spread at the conveyor belt 1 is exposed to heated air, the heating of the air being effected by the sun and/or an air heater 5 in a closed system. The drying process is carried out until a residual moisture of 22.5% is achieved, wherein the dewatered biomass adheres to the conveyor belt 1 at the end of the drying process in the form of flakes. The drying of the biomass is carried out at 50° C. This flake-like form of the biomass is separated from the conveyor belt 1 by a doctor- or scraper edge 9 and collected in a collection container 8 via the collection belt 7.

The application of the concentrated biomass on the conveyor belt 1 is continuous. Equally, the heating of the biomass at the conveyor belt 1 and/or the separation of the biomass from the conveyor belt 1 is continuous.

To heat the air for drying the biomass, the conveyor belt 1, with the biomass adhering to the conveyor belt 1, is directed corresponding to the solar altitude. For this purpose, the star handle 4 is provided.

As already illustrated, the air surrounding the conveyor belt 1 for drying the biomass is heated directly via insolation and indirectly via reflection surfaces 3 provided behind the closed system.

The biomass to be dried is initially transported from the bottom to the top at the conveyor belt 1 arranged at an angle (α) of 70° and exposed to direct insolation, and after the deflection of the conveyor belt, the biomass to be dried is transported at the conveyor belt 1 from the top to the bottom and exposed to indirect insolation.

To optimize the drying process, both in the spreading of the biomass at the conveyor belt 1 and/or in the drying section and/or in the region of the collection container, the moisture and/or the temperature of the air and/or the biomass is measured.

FIG. 3 shows the dewatered biomass obtained according to the embodiment of FIG. 1 in the form of flakes of *Chlorella vulgaris* (drying temperature: 50° C.). The residual moisture amounts to about 22.5%. The region marked by the rectangle in a white dashed line in the upper picture is shown in an enlarged illustration in the lower picture. The final drying step is usually carried out on the same or the following day (see the following paragraph).

FIG. 4 shows the dewatered biomass according to FIG. 3 after the final drying step (convection drying on the conveyor belt, temperature: 50° C.). The residual moisture now amounts to less than 5%. The thickness of the flakes now is about 0.7 mm (median of all flakes of one sample), the flakes have, along their longest dimension, an extension of about 7 cm (median of all flakes of one sample). The region marked by the rectangle in a white dashed line in the upper picture is shown in an enlarged illustration in the lower picture. The flakes of FIG. 4 are filled into a closable container and can be preserved for at least some months.

The invention claimed is:

1. A method for drying microalgae, comprising:
   spreading a suspension comprising microalgae onto a surface of a conveyor belt oriented at an inclination angle of more than 5 degrees relative to an imaginary horizontal plane;
   drying the suspension while the suspension is adhered to the surface of the conveyor belt, wherein during the drying, the suspension is conveyed by the conveyor belt and is dried utilizing heated air to obtain a microalgal biomass having a residual moisture;
   separating the microalgal biomass from the surface utilizing a removal device; and
   collecting the separated microalgal biomass in a container,
   wherein the microalgae includes microalgae from one of the following orders:

the order of Chlorellales;
the order of Volvocales; and
the order of Eustigmatales.

2. The method of claim 1, wherein the removal device is one of:
a scraper edge; and
a doctor.

3. The method of claim 1, wherein the spreading occurs as a result of a portion of the conveyor belt being dipped in a container containing the suspension.

4. The method of claim 1, wherein the drying is carried out at a temperature of between 20° C. and 70° C.

5. The method of claim 1, wherein the microalgae have a coccal or spherical cell shape.

6. The method of claim 1, wherein the inclination angle is more than 30°.

7. The method of claim 1, wherein the suspension spread onto the surface of the conveyor belt has an average layer thickness of between 0.2 mm and 2 mm.

8. The method of claim 1, wherein the surface is at least one of:
a rough surface with an arithmetical average Ra of more than 0.1 µm;
a textured surface; and
a hydrophilic surface.

9. The method of claim 1, wherein the surface is oriented at a contact angle to water of at most 90°.

10. The method of claim 1, wherein the surface includes one of:
an elastomer;
a natural rubber; and
a nitrile rubber.

11. The method of claim 1, wherein the residual moisture is less than 50%.

12. The method of claim 1, wherein the residual moisture is less than 25%.

13. The method of claim 1, wherein the residual moisture is more than 5%.

14. The method of claim 1, wherein the residual moisture is more than 5% and less than 50%.

15. The method of claim 1, further comprising, after the separating, drying the separated microalgal biomass using convection drying until a residual moisture of less than 5% is achieved.

16. The method of claim 1, wherein the microalgae have an average cell diameter of more than 3 µm.

17. The method of claim 1, wherein more than 50 percent by weight of said microalgal biomass collected in the container is in a form of one of:
flakes;
flakes with a longest dimension that is more than 1 cm; and
flakes with a thickness of between 0.1 mm and 2 mm.

18. The method of claim 1, wherein one of:
the order of Chlorellales consists of the family of Chlorellaceae;
the order of Volvocales consists of the family of Haematococcaceae; and
the order of Eustigmatales excludes *Nannochloropsis* and consists of the families of Loboceae, Chlorobothryaceae, Pseudocharaciopsidaceae and Eustigmataceae.

19. A method for drying microalgae, comprising:
arranging a conveyor belt inside a heated enclosure, said conveyor belt being oriented at an inclination angle of more than 5 degrees relative to an imaginary horizontal plane;
placing a suspension comprising microalgae onto a surface of the conveyor belt while the conveyor belt is moving;
drying the suspension with heated air to obtain a dried microalgal biomass having a first residual moisture level;
removing the microalgal biomass from the surface while the conveyor belt continues to move; and
collecting the separated microalgal biomass in a container,
wherein the heated air is heated by at least one of:
solar energy; and
an air heater;
wherein the microalgae is from one of the following orders:
the order of Chlorellales;
the order of Volvocales; and
the order of Eustigmatales.

20. A method for drying microalgae, comprising:
arranging a conveyor belt inside an enclosure;
placing a suspension comprising microalgae onto a surface of the conveyor belt while the conveyor belt is moving;
moving the suspension in an upward direction relative to an imaginary horizontal plane and also in a downward direction relative to the imaginary horizontal plane;
during the moving, drying the suspension with heated air inside the enclosure for between 0.5 minutes and 20 minutes in order to obtain a dried microalgal biomass having a first residual moisture level;
removing the microalgal biomass from the surface while the conveyor belt continues to move; and
drying the removed micro microalgal biomass until the removed micro microalgal biomass reaches a second residual moisture level,
wherein the heated air is heated by at least one of:
solar energy; and
an air heater;
wherein the microalgae includes microalgae from one of the following orders:
the order of Chlorellales;
the order of Volvocales; and
the order of Eustigmatales.

* * * * *